Patented Dec. 22, 1953

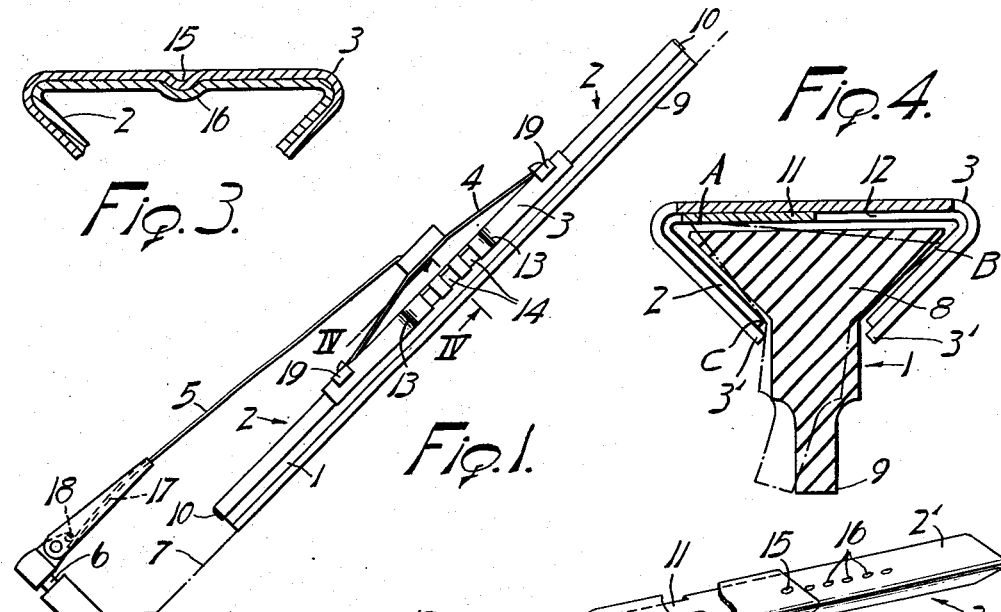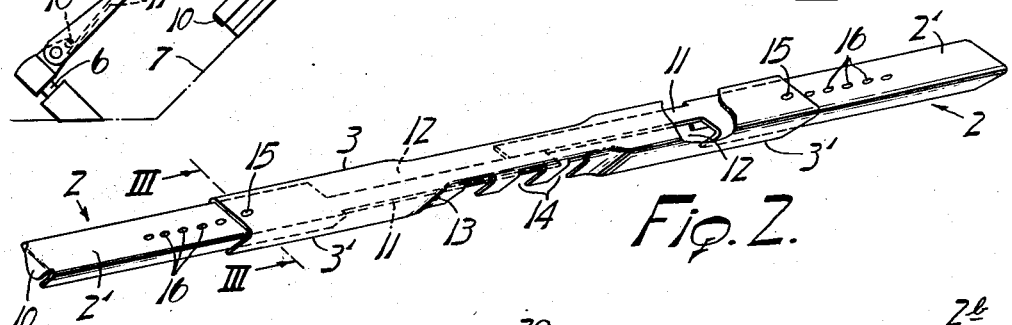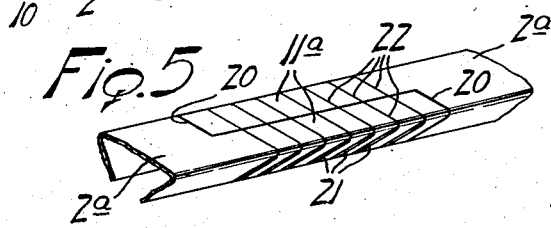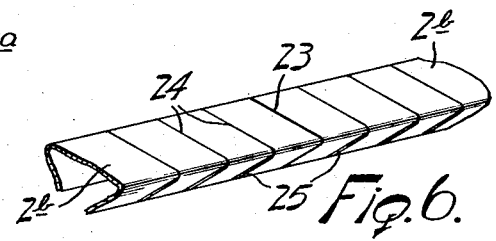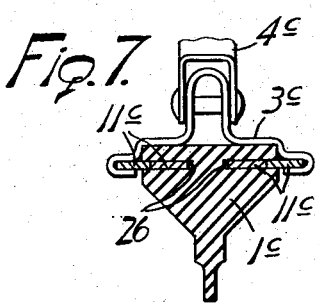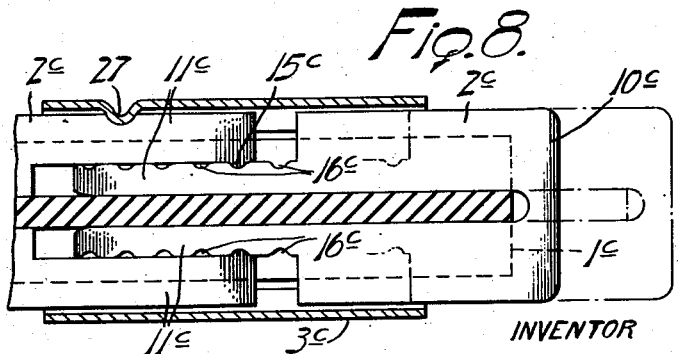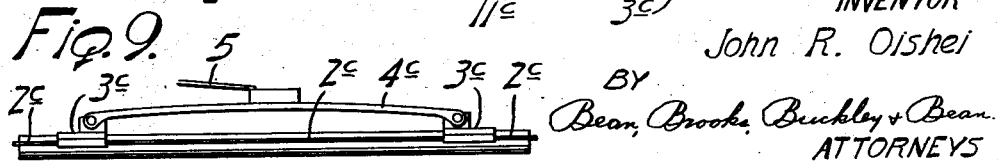

2,663,043

UNITED STATES PATENT OFFICE 2,663,043

ADJUSTABLE WIPING BLADE

John R. Oishei, Buffalo, N. Y., assignor to Trico Products Corporation, Buffalo, N. Y.

Application December 3, 1949, Serial No. 130,894

14 Claims. (Cl. 15—245)

1

This invention relates to the windshield cleaning art and has particular reference to the wiping blade which varies in length approximately four inches in accordance with the factory specifications for the windshield of different makes of automobiles. Heretofore the wipers or blades have been of fixed lengths and this has necessitated the service stations carrying on hand a large and varied assortment of wipers for the replacement trade.

The primary object of the present invention is to provide a replacement wiping blade which is adjustable in size to adapt it for use on any one of a number of windshields of various designs and sizes and thereby avoid the necessity of service stations carrying large stocks of blades to meet the various demands.

A further object of the invention is to provide an adjustable wiper in which the squeegee element is given proper and adequate support for its wiping edge throughout its length for maximum efficiency.

The foregoing and other objects will manifest themselves as this description progresses, reference being made herein to the accompanying drawing, wherein Fig. 1 is a side elevation of the improved wiper as applied to a windshield;

Fig. 2 is a perspective view of the squeegee supporting structure;

Figs. 3 and 4 are transverse sectional views about on lines 3—3 of Fig. 2 and 4—4 of Fig. 1, respectively;

Figs. 5 and 6 are fragmentary perspective showings of other modifications;

Fig. 7 is an end view of a further embodiment.

Fig. 8 is a horizontal sectional view, in fragment, of such further embodiment; and Fig. 9 is a side elevation of the further embodiment.

Referring more particularly to the drawing, the wiper depicted in Figs. 1 and 2 comprises a flexible strip-like squeegee 1 of rubber, or the like, a supporting structure therefor including the extensible and contractible squeegee holder 2 and its support 3, and a mounting bracket 4 attachable to the outer end of the wiper arm 5 which in turn is fixed on an oscillatory shaft 6 for being moved back and forth thereby over the windshield surface 7. The holder 2 is of channeled cross section for receiving the anchoring enlargement 8 along the back of the squeegee, opposite to its wiping edge 9. The anchoring enlargement shown is generally triangular in cross section and is loosely embraced by the conforming side walls of the holder channel so that when the wiper is

2 moved in either direction the squeegee will make a tri-point resilient contact with its holder, as indicated at A, B and C. This loose embrace gives the squeegee a freedom of movement which enables the wiping edge to readily follow the surface contour of the windshield and to make full wiping engagement with irregularities therein throughout its length. It is therefore important that proper support for the squeegee be provided. The supporting structure herein does this and at the same time provides for adjustability of the structure to impart a universal characteristic thereto since it is readily adapted and fitted to windshields of varying dimensions.

Referring to the embodiment of Fig. 2, the primary support 3 of this structure is formed with a through channel for providing a seat to slidably and conformably receive the holder or secondary channels 2, the latter being divided intermediate its length to form separable parts which constitute end or cap sections 2' that are individually slidable into and out of the channeled support for contracting and extending the overall length of the structure to meet the size best suited for a particular windshield. These cap sections telescope within the support channel and give direct support to the squeegee element. Each section has a stop wall 10 turned down from the outer end of its back wall to retain the loose squeegee from lengthwise displacement. From its inner end, within the support 3, each section has a back wall extension 11 to give sustaining support to the wiping edge across the back of the squeegee. The extensions of the two holder sections are laterally offset to slide by each other when the holder is shortened with the pushing of the sections into the support. This overlap of the extensions is maintained preferably throughout all adjustments of the sections, from the maximum dimension of the holder to its minimum. The overlap affords a measure of lateral reinforcement or bracing and gives a full width to the back wall between the voids 12 which intermediate full width increases in extent as the voids decrease in size. These breaks 12 in the back wall are relatively short in length to have little effect upon an efficient rocking action of the squeegee upon the underside of the back wall. When the sections are fully retracted within the channeled support the continuity of the back wall will be complete throughout to provide full backing support for the wiping edge.

The side walls of the holder sections may be coextensive with the offset extensions although in the illustrated showing of Fig. 2 they terminate short of the extensions and consequently leave an intermediate zone where the squeegee lacks lateral support. To counteract this condition somewhat the side walls of the channeled support are insert between the alined side walls of the holder sections to lie coplanar therewith, as indicated at 13. This arrangement provides full lateral support as well as full width backing for the more effective tri-point contact of the squeegee in the holder between the longitudinally spaced voids 12. The side walls or flanges of the primary channel 3 and the secondary channels 2 preferably converge outwardly with the walls of the primary extending beyond those of the secondaries, as at 3', to give lateral support to the squeegee closer to the wiping edge for controlling the wiping action when the squeegee is pressed into contact with the windshield surface. The inset walls 13 may be interrupted at intervals 14 to establish a flexible connection between the opposite and relatively rigid end portions of the blade. Each adjustment may be secured by a suitable latch means, as by a detent 15 on the channeled support engaging the selected one of a series of recesses 16 in the holder.

The mounting bracket 4 is in nature a distributing medium for the arm pressure as applied by a flat spring 17 reacting upon a bearing 18, in a well known manner. The opposite ends of this pressure distributing bracket or frame are connected to the channeled support, as by clips 19, thereby providing the frame with a seat for the holder.

In practice, the squeegee will be of the maximum length and placed within its holder likewise of maximum length, as depicted in Fig. 2. It will be necessary for the service station to stock up only on this one size. When a shorter blade is desired the squeegee element will be trimmed accordingly and the holder sections pushed into the support until arrested by the end walls 10 coming into contact with the adjacent ends of the squeegee, following which the corresponding detents 15 will engage their underlying recesses to center the holder sections for freeing the squeegee for free floating movement therein.

The voids 12 in the full width backing for the squeegee element may be eliminated altogether by making the extensions 11a sufficiently long to fill the space when the holder sections 2a are fully extended, as shown in the modification of Fig. 5. Here the free ends of the extensions abut the shoulders 20 on the companion sections and thereby afford a solid backing for the wiping edge. The side walls of the holder also are coextensive with the extensions to provide proper support. When it is desired to shorten the overall length of the holder, and therefore the blade, increments of the extensions and their side walls may be severed uniformly. To facilitate this procedure the side walls are divided by slits 21 while the composite backing, as provided by the cooperating extensions, is provided with score lines 22 or otherwise weakened to enable ready severance.

In the modification of Fig. 6 the extensions have been done away with and the holder sections are caused to squarely abut one another at their inner ends within the channeled support, as depicted at 23. Transverse score lines 24 delineate removable divisions of each section 2b, these lines joining opposing slits 25 in the side walls. As the required divisible portions are removed the holder sections are slid further into the channeled support to a new abutting relationship which determines the effective length of the reconstructed wiper.

Figs. 7, 8 and 9 illustrate another modification wherein the channeled support, which may be a single unit as in Fig. 2, is shown herein as consisting of longitudinally spaced channeled sections 3c. The holder comprises three sections 2c, two end sections and an intermediate connecting section. Each holder section has parallel sides fitting in longitudinal grooves or seats 26 in the opposite sides of the squeege element 1c. The adjacent ends of the holder sections have overlapping extensions 11c which are embraced by the channeled support 3c to afford lateral support for holding the cooperating parts of the squeegee backing in place. The parallel sides of the end or cap sections may be joined by a transverse stop wall 10c. Each end section may be secured to the central holder section by a detent 15c selectively placeable in the recesses 16c, while each channeled holder member may be interlocked to one section or the other by a spring detent 27. A bracket or yoke 4c serves to distribute the spring pressure from the actuating arm 5 to the channeled holder.

In all forms of the invention the overall length of the blade may be modified to fit a given windshield. The procedure is simple by reason of the practical construction. The channeled supports overlie the joints of the extensible and contractible holder to give support thereto, while the holder provides adequate support for the squeegee element entirely through the channeled support so as to provide proper backing support for the wiping edge.

The foregoing description has been given in detail for clarity and without thought of limitation since the inventive principles involved are capable of assuming other physical embodiments without departing from the spirit of the invention and the scope of the appended claims.

What is claimed is:

1. A windshield wiper comprising an elongate squeegee element having a wiping edge along one longitudinal margin, an extensible holder having longitudinally alined and relatively adjustable sections engaged with the opposite margin of the element to give support to the wiping edge thereof, a support for the holder having a seat receiving the adjacent ends of the sections to give support thereto, said adjacent ends having contacting portions with coplanar faces providing a continuous supporting surface through the seat to enable the extensible holder giving sustaining support to the wiping edge of the squeegee element throughout its length, actuating arm attaching means on the support at longitudinally spaced points along said support adjacent the ends of the latter across the seating areas of the holder sections therein.

2. An adjustable wiping blade having a primary channel, secondary channels mounted by slidable contact within the primary channel, the side walls of each channel converging outwardly with the primary channel extending beyond the flanges of the secondary channels on substantially the same angle, said primary channel having its central portion reduced in cross-section to provide longitudinal flexibility, and a squeegee loosely embraced by the channels, the said channels being employed to engage simultaneously the free-floating squeegee member on its sides to substantially support the squeegee in angular relation to both channels simultaneously for controlling the transverse action of the squeegee member when pressed in contact with the surface of the glass to be wiped.

3. A wiper comprising a primary channel arranged centrally in respect to a mounting yoke, said channel having side flanges, secondary channels arranged end to end within the primary channel to be maintained in a fixed relation thereto, a squeegee within the secondary channels, the side flanges on the said secondary channels being removed on their inner ends for a prescribed distance to permit the squeegee in its centralized position to receive its side support from the flanges of the primary channel over the distance between the inner ends of the secondary channel while receiving uniform top support over the entire length of the squeegee from the inner back wall of the secondary channels.

4. A windshield cleaner comprising a rubber squeegee having a wiping edge along one longitudinal margin and an anchoring enlargement along its opposite margin, channeled holder sections longitudinally alined on and loosely embracing the anchoring enlargement to give backing support to the wiping edge, a channeled support slidably receiving the holder sections, said holder sections having parts in longitudinal alinement with each other and being relatively adjustable supporting contact in the channel of the support lengthwise of the squeegee to provide continuity of support for the latter through the channeled support, latch means having cooperating parts on each end of the support and the respective holder section adjustably securing the latter in the channel, and means for attaching the support to an actuating arm.

5. A windshield wiper comprising an elongate squeegee element having a wiping edge along one longitudinal margin and an anchoring enlargement along its opposite margin, an extensible holder having longitudinally adjustable end sections engaged with the anchoring enlargement to give support to the wiping edge thereof, and a support for the holder having an enclosed seat adjustably receiving the adjacent ends of the sections in flush end to end relation, the adjacent inner ends of the sections having contacting portions with coplanar faces providing a continuous supporting surface across the seat to enable the extensible holder giving sustaining support to the wiping edge of the squeegee element throughout its length.

6. A windshield wiper comprising an elongate squeegee element having a wiping edge along one longitudinal margin, an extensible holder having relatively adjustable sections arranged end to end and engaged with the squeegee element to give support to the wiping edge thereof, a channeled support for the holder receiving the adjacent ends of the sections to give support thereto, said adjacent ends having contacting portions with coplanar faces providing a continuous supporting surface through the channeled support to give sustaining support to the wiping edge of the squeegee element throughout its length, means for securing the adjustable sections relative to the support and an elongate bracket having its opposite ends connected to the support at longitudinally spaced points.

7. A windshield wiper comprising an elongate squeegee element having a wiping edge along one longitudinal margin and an anchoring enlargement along its opposite margin, an extensible holder having longitudinally adjustable sections engaged with the anchoring enlargement to give support to the wiping edge thereof, a support for the holder having a seat adjustably receiving the sections in end to end relation, the adjacent ends of the sections having contacting portions with coplanar faces providing a continuous supporting surface across the seat to enable the extensible holder giving sustaining support to the wiping edge of the squeegee element throughout its length, and means individually securing the sections in the seat for independent adjustment.

8. A windshield wiper comprising an elongate squeegee element having a wiping edge along one longitudinal margin and an anchoring enlargement along its opposite margin, an extensible holder having longitudinally adjustable sections engaged with the anchoring enlargement to give support to the wiping edge thereof, and a support for the holder having a seat adjustably receiving the sections in end to end relation, the adjacent ends of the sections providing a continuous supporting surface across the seat to enable the extensible holder giving sustaining support to the wiping edge of the squeegee element throughout its length, said sections having side walls embracing the squeegee element, the side walls of one section being longitudinally spaced from those of the adjacent section, and said support having side walls inset into such space to lie coplanar with the side walls of the sections for giving lateral support to the squeegee element.

9. A windshield wiper comprising an elongate squeegee element having a wiping edge along one longitudinal margin, an extensible holder having relatively adjustable sections arranged end to end and engaged with the squeegee element to give support to the wiping edge thereof, a channeled support for the holder receiving the adjacent ends of the sections to give support thereto, said adjacent ends having laterally offset extensions slidably engaging each other and providing a continuous supporting surface through the channel to give sustaining support to the wiping edge of the squeegee element throughout its length, and an elongate bracket having its opposite ends connected to the support at longitudinally spaced points.

10. A windshield wiper comprising a squeegee element having a wiping edge, a primary channel having means for attachment to an actuating arm, and secondary opposed channels slidably received end to end within the primary channel and loosely embracing the squeegee element to give backing support for the wiping edge thereof, the adjacent ends of the secondary channels having contacting portions with coplanar faces providing continuous coplanar backing support through the primary channel for the squeegee element.

11. A windshield wiper comprising a squeegee element having a wiping edge, a primary channel having means for attachment to an actuating arm, and secondary channels slidably received end to end within the primary channel and embracing the squeegee element to give backing support for the wiping edge thereof, the adjacent ends of the secondary channels telescoping within the primary channel and having contacting portions with coplanar faces providing continuous support through the primary channel for the squeegee element.

12. A windshield wiper comprising an elongate squeegee member, a holder having sections relatively adjustable lengthwise thereof and having contacting portions with coplanar faces providing a support for the squeegee member continuously throughout its length, and an arm-pressure distributing frame for the holder having an elongate bracket with arm attaching means intermediate its length and a channeled seat adjustably receiving the extensible sections individually to enable independent adjustment in providing support for the holder and its squeegee member.

13. A windshield wiper comprising a flexible squeegee element having a wiping edge, a primary channel having its side walls interrupted medially to provide for a hinging action between opposite rigid end portions, and secondary channels slidable within the rigid end portions of the primary channel and embracing the back of the squeegee element, said secondary channels having flexible extensions on their adjacent ends to give support to its wiping edge across the medial portion of the primary channel.

14. A windshield wiper comprising an elongate squeegee member, a holder having relatively adjustable end sections with overlapping inner portions having coplanar faces providing a support for the squeegee member throughout its length, an arm-pressure distributing frame for the holder having an elongate bracket with arm attaching means intermediate its length and seat means at its opposite ends receiving the holder for lengthwise adjustment with respect thereto, and means securing the holder at predetermined bodily adjustments in the seat means, said securing means enabling individual adjustment of the sections within the seat.

JOHN R. OISHEI.

References Cited in the file of this patent

UNITED STATES PATENTS

| Number | Name | Date |
|---|---|---|
| 629,851 | Glen | Aug. 1, 1899 |
| 1,510,509 | Stadeker | Oct. 7, 1924 |
| 1,804,867 | Fisher | May 12, 1931 |
| 2,149,037 | Zaiger | Feb. 28, 1939 |

FOREIGN PATENTS

| Number | Country | Date |
|---|---|---|
| 518,920 | Great Britain | Mar. 12, 1940 |
| 524,165 | Great Britain | July 31, 1950 |